United States Patent
Sakai

(10) Patent No.: US 12,412,298 B2
(45) Date of Patent: Sep. 9, 2025

(54) LEARNING DEVICE, CONTROL METHOD, AND STORAGE MEDIUM

(71) Applicant: NEC Corporation, Tokyo (JP)

(72) Inventor: Ryosuke Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 423 days.

(21) Appl. No.: 17/916,870

(22) PCT Filed: Apr. 13, 2020

(86) PCT No.: PCT/JP2020/016322
§ 371 (c)(1),
(2) Date: Oct. 4, 2022

(87) PCT Pub. No.: WO2021/210051
PCT Pub. Date: Oct. 21, 2021

(65) Prior Publication Data
US 2023/0162388 A1    May 25, 2023

(51) Int. Cl.
*G06T 7/73* (2017.01)
*G06T 7/68* (2017.01)

(52) U.S. Cl.
CPC .......... *G06T 7/73* (2017.01); *G06T 7/68* (2017.01); *G06T 2207/20081* (2013.01)

(58) Field of Classification Search
CPC .... G06T 7/73; G06T 7/68; G06T 2207/20081
USPC ...................................................... 382/155
See application file for complete search history.

(56) References Cited

U.S. PATENT DOCUMENTS

| 10,977,515 B2 * | 4/2021 | Watanabe ........... G06F 16/5854 |
| 2009/0220157 A1 | 9/2009 | Kato et al. |
| 2012/0002867 A1 | 1/2012 | Ishiyama et al. |
| 2012/0087590 A1 | 4/2012 | Kato et al. |

FOREIGN PATENT DOCUMENTS

| JP | 2009-211177 A | | 9/2009 | |
| JP | 2010-218051 A | | 9/2010 | |
| JP | 2017204219 | * | 11/2017 | |
| WO | 2010/104181 A1 | | 9/2010 | |
| WO | WO2012063469 | * | 5/2012 | ............. G06T 7/246 |

OTHER PUBLICATIONS

International Search Report for PCT Application No. PCT/JP2020/016322, mailed on Jun. 23, 2020.

* cited by examiner

*Primary Examiner — Jerome Grant, II*

(57) ABSTRACT

The learning device 1A includes an acquiring means 23A, a conversion means 24A, and a learning means 25A. The acquiring means 23A is configured to acquire a combination of a first label that is a unique label for each feature point of an object and a feature point image in which a feature point corresponding to the first label is imaged. The conversion means 24A is configured to convert the first label to a second label that is set to a same label for feature points of the object with at least one of a congruence relation in appearance or a mirror symmetry relation to one another. The learning means 25A is configured to learn an inference engine based on the second label, the feature point image, and correct answer data regarding a position of the feature point, the inference engine being configured to perform an inference on the position of the feature point included in an image that is inputted to the inference engine.

5 Claims, 16 Drawing Sheets

FIG. 4A    L1=5    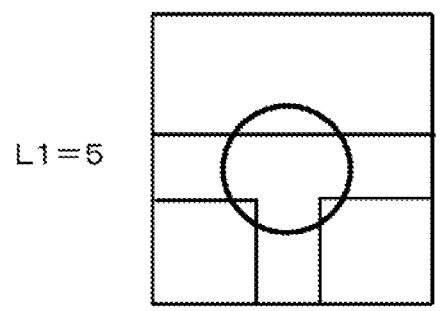
FIG. 4B    L1=6    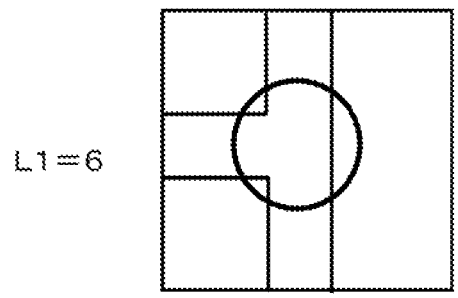
FIG. 4C    L1=3    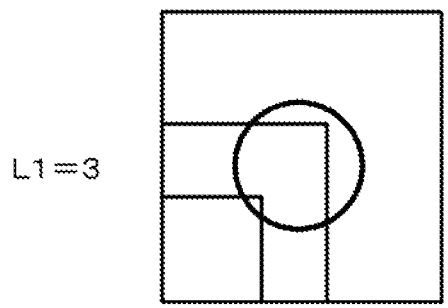
FIG. 4D    L1=13   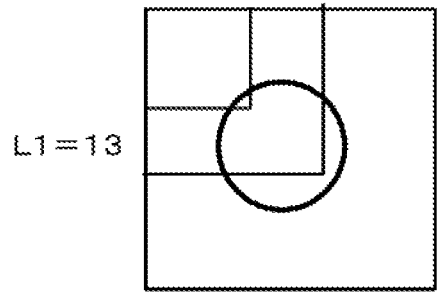

FIG. 5A   L1=5   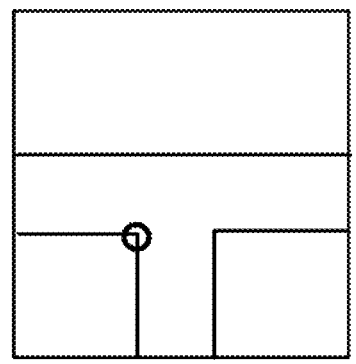
FIG. 5B   L1=6   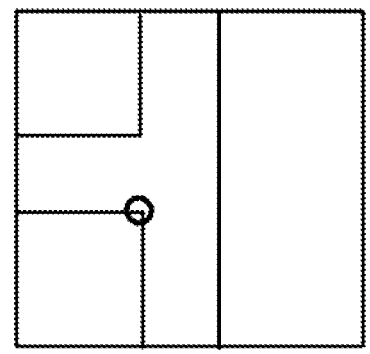
FIG. 5C   L1=3   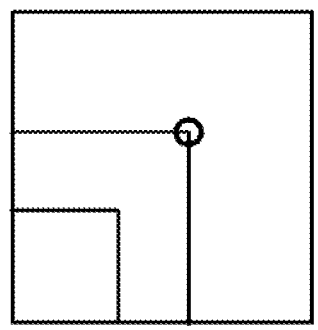
FIG. 5D   L1=13   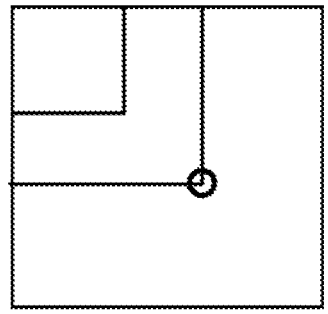

LEARNING DEVICE, CONTROL METHOD, AND STORAGE MEDIUM

This application is a National Stage Entry of PCT/JP2020/016322 filed on Apr. 13, 2020, the contents of all of which are incorporated herein by reference, in their entirety.

TECHNICAL FIELD

The present disclosure relates to a technical field of a learning device, a control method, and a storage medium for performing machine learning using images.

BACKGROUND ART

There exists a technique that autonomously extracts the positions of predefined feature points from a given image. For example, Patent Literature 1 discloses a technique of specifying rough positions of feature points defined in the former stage process and then extracting accurate positions of the feature points in the latter stage process by correcting a subtle deviation in the former stage process.

CITATION LIST

Patent Literature

Patent Literature 1: JP 2009-211177A

SUMMARY

Problem to be Solved

In the method of extracting positions of feature points by learning, the accuracy and robustness of the extraction model to be made increases with increasing number of training data to be used. On the other hand, collecting such large amount of training data is generally time consuming. Further, in Patent Literature 1, it is necessary to prepare the same number of the extractor to be used in the latter stage for specifying the positions of the feature points as the number of labels. Thus, in this case, the labor for preparing the extractor enormously increases with increasing number of labels.

In this disclosure, it is an example object of the present disclosure to provide a learning device, a control method, and a storage medium suitable for leaning of feature extraction.

Means for Solving the Problem

In one mode of the learning device, there is provided a learning device including: an acquiring means configured to acquire a combination of a first label that is a unique label for each feature point of an object and a feature point image in which a feature point corresponding to the first label is imaged; a conversion means configured to convert the first label to a second label that is set to a same label for feature points of the object with at least one of a congruence relation in appearance or a mirror symmetry relation to one another; and a learning means configured to learn an inference engine based on the second label, the feature point image, and correct answer data regarding a position of the feature point, the inference engine being configured to perform an inference on the position of the feature point included in an image that is inputted to the inference engine.

In one mode of the inference device, there is provided an inference device including: a first inference means configured to perform, in a case where an object image in which an object is imaged is inputted thereto, a first inference on positions of feature points of the object and first labels corresponding to the feature points; a conversion means configured to convert the first labels to second labels, the second labels being set to a same label for feature points of the object with at least one of a congruence relation in appearance or a mirror symmetry relation to one another; and a second inference means configured to infer, by using an inference engine, the positions of the feature points based on the second labels and feature point images in which the feature points are respectively imaged, the feature point images being generated from the object image based on a result of the first inference, the inference engine being learned by a learning device.

In one mode of the control method, there is provided a control method executed by a computer, the control method including: acquiring a combination of a first label that is a unique label for each feature point of an object and a feature point image in which a feature point corresponding to the first label is imaged; converting the first label to a second label that is set to a same label for feature points of the object with at least one of a congruence relation in appearance or a mirror symmetry relation to one another; and learning an inference engine based on the second label, the feature point image, and correct answer data regarding a position of the feature point, the inference engine being configured to perform an inference on the position of the feature point included in an image that is inputted to the inference engine.

In one mode of the storage medium, there is provided a storage medium storing a program executed by a computer, the program causing the computer to function as: an acquiring means configured to acquire a combination of a first label that is a unique label for each feature point of an object and a feature point image in which a feature point corresponding to the first label is imaged; a conversion means configured to convert the first label to a second label that is set to a same label for feature points of the object with at least one of a congruence relation in appearance or a mirror symmetry relation to one another; and a learning means configured to learn an inference engine based on the second label, the feature point image, and correct answer data regarding a position of the feature point, the inference engine being configured to perform an inference on the position of the feature point included in an image that is inputted to the inference engine.

Effect

An example advantage according to the present invention is to suitably perform leaning regarding feature extraction.

BRIEF DESCRIPTION OF THE DRAWINGS

FIGS. 4A to 4D are enlarged views of the feature points whose first labels are "5", "6", "3", and "13", respectively.

FIG. 5A to 5D are enlarged views of the feature points whose first labels are "5", "6", "3", and "13", respectively, in a case where the positions of the feature points to be extracted are defined more strictly than the case shown in FIG. 3.

EXAMPLE EMBODIMENTS

Hereinafter, an example embodiment of a learning device, a control method, and a storage medium will be described with reference to the drawings.

First Example Embodiment (1) Schematic Configuration

Figure 1:
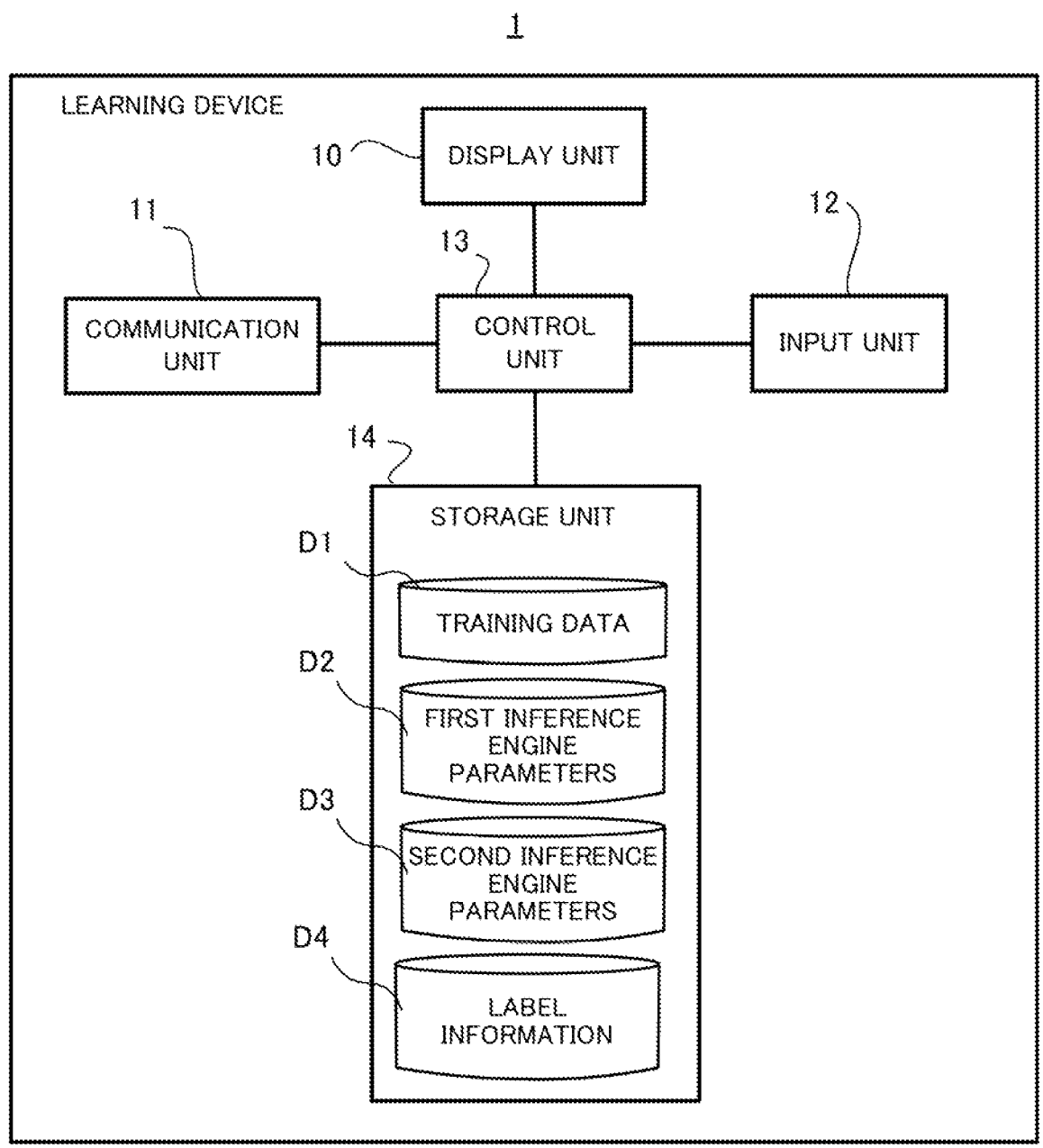
FIG. 1 illustrates a schematic configuration of a learning device according to a first example embodiment.

FIG. 1 shows a schematic configuration diagram of a learning device 1 according to the first example embodiment. The learning device 1 is a device for learning a second inference engine used in an inference regarding feature point extraction of an object shown in a given image, wherein, in the above-mentioned inference, a first inference engine provided in the former stage and the second inference engine provided in the latter stage are used. Hereafter, a target object of feature point extraction is also referred to as "reference object Ro". The learning device 1 mainly includes a display unit 10, a communication unit 11, an input unit 12, a control unit 13, and a storage unit 14.

The display unit 10 displays information under the control of the control unit 13. Examples of the display unit 10 include a display and a projector configured to emit display light. The communication unit 11 is a wired or wireless communication interface for transmitting and receiving data to and from external devices under the control of the control unit 13. The input unit 12 generates an input signal based on the user's operation and transmits the input signal to the control unit 13. The input unit 12 is an arbitrary input interface for the user to perform instructions to the learning device 1, and examples of the input unit 12 include a button, an arrow pad, a keyboard, a mouse, a touch panel, a voice input device, and the like.

The control unit 13 includes, for example, one or more processors such as a CPU (Central Processing Unit), a GPU (Graphics Processing Unit), and a quantum processor, and a volatile memory that functions as a working memory of the processors, and performs overall control of the learning device 1.

The storage unit 14 includes a nonvolatile memory in which the control unit 13 stores various information necessary for learning. The storage unit 14 may be an external storage device such as a hard disk connected to or built in to the learning device 1, or may be a storage medium such as a flash memory. Further, the storage unit 14 stores a program to be executed by the control unit 13. Further, the storage unit 14 stores training data D1, first inference engine parameters D2, second inference engine parameters D3, and label information D4.

The training data D1 is a training data sets indicative of plural combinations of an image (also referred to as "object image Imo") in which a reference object Ro is imaged, and data (also referred to as "correct answer data Cd") indicating a correct answer regarding feature points of the reference object Ro to be extracted. Here, the correct answer data Cd is data indicating the correct answer of the positions, in the object image Imo, of the feature points and the corresponding labels (also referred to as "first labels L1") which indicates the classes of the feature points and which are unique labels of the feature points. In this case, in some embodiments, the training data D1 may include the object images Imo, captured in various imaging environments (e.g., environments which vary depending on the presence/absence of illumination and degree of illumination), of the reference object Ro subject to feature point extraction.

Here, the reference object Ro subject to feature point extraction is a structure or any other object in which specific feature points have the property (also referred to as "congruence in appearance") of becoming congruent in appearance depending on the perspective, or the property (also referred to as "mirror symmetry") of becoming congruent by performing a mirror operation. Examples of the reference object Ro include: a sports field of each sports such as tennis, swimming, soccer, table tennis, basketball, rugby; a field of each game such as shogi and go; a stage of a theater; and a model of a sports field. When it is assumed that the application to courts with various types of surfaces, the training data D1 may include object images Imo in which various reference objects Ro (e.g., tennis courts corresponding to various surfaces in the case of tennis) present in plural locations are captured.

The first inference engine parameters D2 are information on parameters for configuring the first inference engine which is an inference engine configured to infer the position of each feature point of the reference object Ro shown in an inputted image and the first label L1 of the each feature point.

For example, the first inference engine is a learning model that is learned to output information on the position of each feature point to be extracted and the first label L1 to which the each feature point corresponds when the object image Imo of the reference object Ro subject to feature point extraction is inputted. The information on the position of each feature point outputted by the first inference engine may be a reliability map, in the image, of the each feature point, or may be a coordinate value, or may indicate a range in which the each feature point may exist. Here, the reliability map is a map on the image showing the reliability of existence of the each feature point for each coordinate value. The "coordinate value" may be a value indicative of a position in an image in pixel units, or may be a value indicative of a position in an image in sub-pixel units. The learning model used for learning of the first inference engine may be a learning model based on a neural network, or may be any other type of the learning model such as a support vector machine, or may be a combination of these. For example, if the learning model described above is a neural network such as a convolutional neural network, the first inference engine parameters D2 indicate a variety of parameters such as layer structure, neuron structure of each layer, the number of filters and filter sizes in each layer, and the weights for each element of each filter.

The second inference engine parameters D3 are information indicative of parameters for configuring a second inference engine that is an inference device which performs inference relating to the position of a feature point when an image (also referred to as "feature point image Imf") in which the feature point and its periphery are imaged is inputted thereto. The feature point image Imf is a partial image showing a part of the object image Imo inputted to the first inference engine and is generated based on the inference result by the first inference engine. The feature point image Imf may be enlarged to be the same size as the object image Imo or to be as another predetermined size.

The second inference engine parameters D3 include parameters for configuring the second inference engine for each label (also referred to as the "second label L2") of the feature points in which the same label value is assigned to feature points (a group of feature points) having a congruence in appearance or a mirror symmetry. Then, the second inference engine is learned for each second label L2, wherein the total number of the second labels L2 is reduced from the total number of the first labels L2 based on the congruence in appearance or the mirror symmetry. The second inference engine is, for example, a learning model that is learned so as to output information on a combination of the position of the feature point to be extracted and the second label L2 to which the feature point belongs when the feature point image Imf is inputted thereto. The information relating to the position of the feature point outputted by the second inference engine may be a reliability map, in the image, of the target feature point, or may be a coordinate value. The learning model used for learning of the second inference engine may be a learning model based on a neural network, or may be any other type of the learning model such as a support vector machine, or may be a combination of these. The second inference engine parameters D3 are generated by the control unit 13 by the learning process to be described later, and is stored in the storage unit 14.

The label information D4 is information indicating the correspondence between the first labels L1 and the second labels L2. The label information D4 is generated by the learning device 1 in the pre-processing of the learning of the second inference engine and is stored in the storage unit 14. In some embodiments, in the label information D4, flag information indicating the mirror symmetry together with the corresponding second label is associated with such first labels L1 corresponding to feature points having a mirror symmetry relation to one another.

The configuration of the learning device 1 shown in FIG. 1 is an example, and various changes may be made to this configuration. For example, instead of storing the training data D1 by itself, the learning device 1 may acquire the training data D1 by reading the training data D1 stored in an external device connected by wired or wireless communication to the learning device 1. Similarly, the learning device 1 may store at least one of the first inference engine parameters D2, the second inference engine parameters D3, and the label information D4 in an external device connected by wired or wireless communication to the learning device 1. The above-described external device may be an external storage device such as a hard disk connected by wired or wireless communication to the learning device 1, or one or more server devices that perform data communication with the learning device 1. Similarly, the learning device 1 may not include at least one of the display unit 10, the communication unit 11, or the input unit 12. In this case, the learning device 1 may be electrically connected by wired or wireless communication to a device having a function corresponding to at least one of the display unit 10, the communication unit 11, or the input unit 12.

(2) Functional Block

Figure 2:
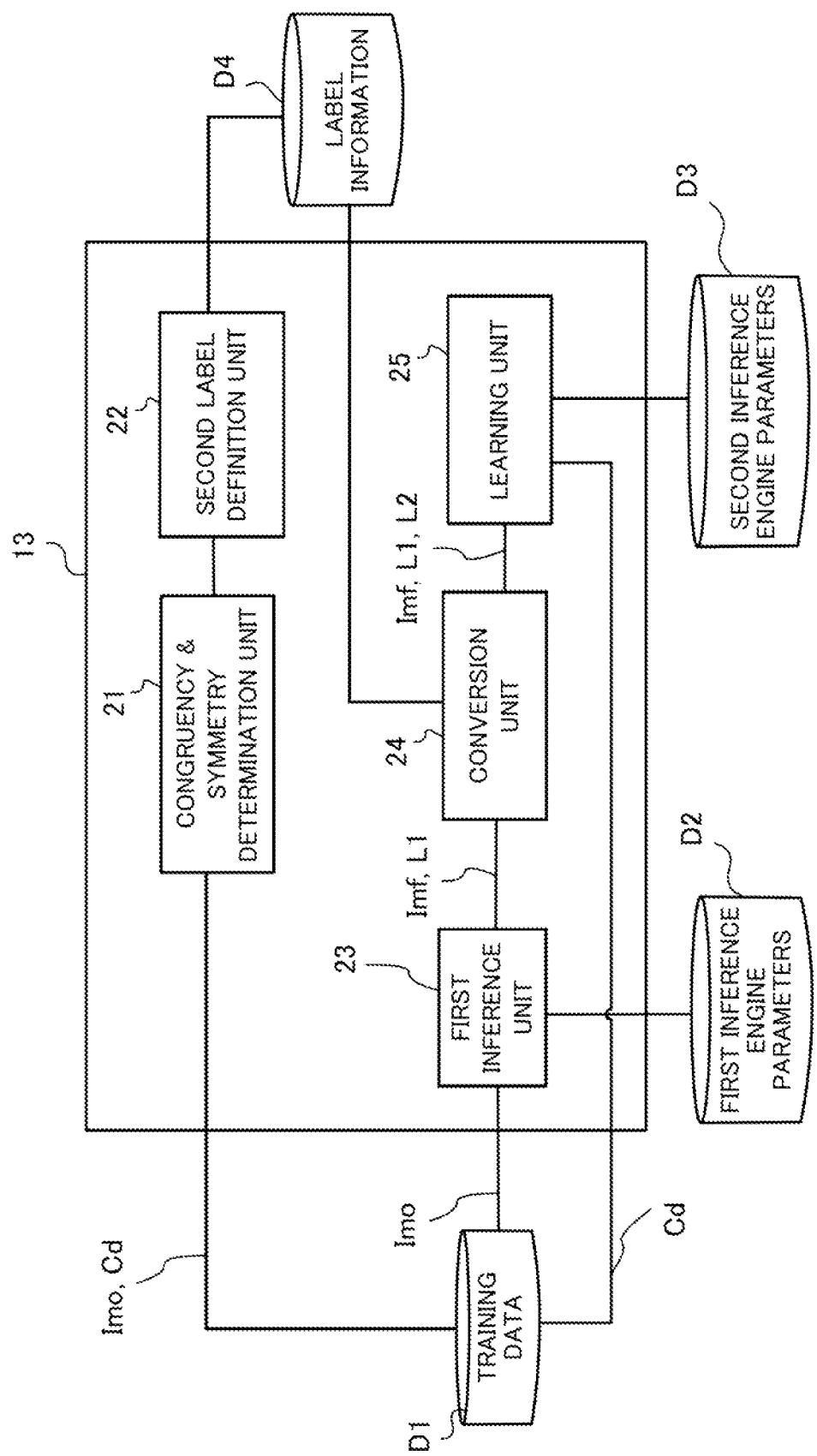
FIG. 2 is a block diagram showing a functional configuration of a control unit.

FIG. 2 is an example of a functional block diagram showing a function of the control unit 13. In the present example embodiment, the control unit 13 performs generation (also referred to as "learning pre-processing") of the label information D4 necessary for learning (training) of the second inference engine, and learning processing of the second inference engine for generating the second inference engine parameters D3. As shown in FIG. 2, the control unit 13 functionally includes a congruence and symmetry determination unit 21, a second label definition unit 22, a first inference unit 23, a conversion unit 24, and a learning unit 25. The congruence and symmetry determination unit 21 and the second label definition unit 22 mainly perform learning pre-processing, and the first inference unit 23, the conversion unit 24, and the learning unit 25 mainly perform learning processing of the second inference engine. In FIG. 2, although the blocks configured to exchange data with each other are connected to each other by solid line, the combinations of blocks configured to exchange data are not limited to FIG. 2. The same applies to another functional block diagrams to be described later.

The congruence and symmetry determination unit 21 makes a determination on congruence in appearance and mirror symmetry among feature points of the reference object Ro subject to feature extraction. For example, the congruence and symmetry determination unit 21 extracts, a plurality of combinations of the object image Imo of the target reference object Ro and the corresponding correct answer data Cd from the training data D1, and then, based on an arbitrary image processing technique, generates a three-dimensional model of the target reference object Ro from the extracted object image Imo Furthermore, the congruence and symmetry determination unit 21 recognizes the positions, in the generated three-dimensional model, of the feature points for each first label based on the extracted correct answer data Cd. Then, in order to determine presence or absence of each of a congruence in appearance and a mirror symmetry, the congruence and symmetry determination unit 21 performs matching (verification) for each region at and around the feature point of the three-dimensional model. The region at and around the feature point described above is set to be substantially the same range as the range to be captured in the feature point image Imf. In some embodiments, the congruence and symmetry determination unit 21 may determine the presence or absence of the mirror symmetry by matching the three-dimensional model after the mirror operation with the three-dimensional model without the mirror operation. Then, the congruence and symmetry determination unit 21 supplies information indicative of the combinations (groups) of the first labels with the congruence relation in appearance or the mirror symmetry relation to the second label definition unit 22. In some embodiments, if the parameters relating to the three-dimensional model of the target reference object Ro is stored in advance in the storage unit 14, the congruence and symmetry determination unit 21 may generate a three-dimensional model of the reference object Ro by referring to the parameters.

Instead of determining the congruence in appearance and mirror symmetry from the three-dimensional model, the congruence and symmetry determination unit 21 may generate an orthographic image of the target reference object Ro by performing orthographic transformation from a plurality of object images Imo, and determine whether or not there is a congruence relation in appearance or mirror symmetry relation based on the orthographic image. In this case, for example, the congruence and symmetry determination unit 21 sets a surrounding region with the same range as the feature point image Imf for each feature point shown in the orthographic image, and performs matching (verification) between the set surrounding regions to thereby determine whether or not there is a congruence relation in appearance or a mirror symmetry relation. In some embodiments, the orthographic image may be stored in advance in the storage unit 14 or the like. In yet another example, the congruence and symmetry determination unit 21 may display the above-described three-dimensional model or orthographic image on the display unit 10 in a condition in which the feature points are clearly indicated, and accept an input that specifies a combination of feature points (or first labels) having the congruence relation in appearance or mirror symmetry relation by the input unit 12. Accordingly, the congruence and symmetry determination unit 21 may determine the congruence in appearance or the mirror symmetry of the feature points adjacent to each other based on the user input.

The second label definition unit 22 defines the second labels L2 based on the determination result regarding the congruence in appearance and the mirror symmetry by the congruence and symmetry determination unit 21. Specifically, the second label definition unit 22 determines the second label L2 corresponding to each of the first labels L1 based on the above-described determination result and then generates the label information D4 indicating the correspondence between the first labels L1 and the second labels L2. In this case, for example, the second label definition unit 22 may associate, with first labels L1 having a mirror symmetry relation to one another and having the same second label L2, flag information indicating that the above-mentioned first labels L1 are mirror-symmetric with one another.

The first inference unit 23 inputs the object image Imo extracted from the training data D1 to the first inference engine configured based on the first inference engine parameters D2, and acquires the inference result outputted from the first inference engine. Then, the first inference unit 23 generates a combination of the feature point image Imf and the first label L1 for each detected feature point based on the acquired inference result. In this case, for example, when the inference result of the first inference engine indicates the coordinate value of the feature point, the first inference unit 23 generates a rectangular region with a predetermined size centered on the indicated coordinate value in the object image Imo as the feature point image Imf. In another example, when the inference result outputted by the first inference engine indicates the reliability map of the feature point, the first inference unit 23 generates a rectangular region with a predetermined size centered on the coordinate value having the highest reliability in the object image Imo as the feature point image Imf. The first inference unit 23 supplies combinations of the generated feature point image Imf and the first label L1 to the conversion unit 24.

Based on the label information D4, the conversion unit 24 converts the first label L1 supplied from the first inference unit 23 into the second label L2, and supplies the first label L1, the second label L2, and the feature point image Imf to the learning unit 25.

In this case, in some embodiments, if the conversion unit 24 specifies, based on the label information D4, a feature point image Imf corresponding to a feature point which becomes mirror symmetrical with another feature point and which has the same second label L2 as the other feature point, the conversion unit 24 supplies a feature point image Imf obtained by performing the mirror operation on the specified feature point image Imf to the learning unit 25. Thus, the conversion unit 24 suitably supplies all feature point images Imf with a congruence relation in appearance to one another for each second label L2 to the learning unit 25. In other words, when there are a first feature point and a second feature point having the mirror symmetry relation to each other, the conversion unit 24 converts the feature point image Imf corresponding to the second feature point by performing the mirror operation. Thereafter, based on the feature point image Imf corresponding to the first feature point and the mirror-converted feature point image Imf corresponding to the second feature point, the learning unit 25 performs training of the second inference engine relating to the second label to which the first feature point and the second feature point belong.

The learning unit 25 generates the second inference engine parameters D3 for each second label L2 by training the second inference engine for each second label L2 on the basis of the feature point image Imf supplied from the conversion unit 24 and the correct answer position of the feature point indicated by the correct answer data Cd extracted from the training data D1. In this case, based on the relative position of the feature point image Imf with respect to the object image Imo, the learning unit 25 converts the correct answer position, in the object image Imo, of the feature point of the first label L1 indicated by the correct answer data Cd to the correct answer position in the feature point image Imf. Then, the learning unit 25 performs the training of the second inference engine based on the converted correct solution position and the feature point image Imf. In the training of the second inference engine, the learning unit 25 determines the parameters of the second inference engine such that, for example, an error (loss) between the position of the feature point outputted by the second inference engine when the feature point image Imf is inputted to the second inference engine and the correct answer position of the feature point is minimized. The algorithm for determining the parameters described above to minimize loss may be any learning algorithm used in machine learning, such as a gradient descent method and an error back-propagation method. Then, the learning unit 25 stores the parameters of the second inference engine after the training as the second inference engine parameters D3. The learning device 1 may immediately transmit the second inference engine parameters D3 to the inference device to be described later through the communication unit 11, or may supply the second inference engine parameters D3 to the inference device via a storage medium detachable from the learning device 1 and the inference device.

Each component of the congruence and symmetry determination unit 21, the second label definition unit 22, the first inference unit 23, the conversion unit 24, and the learning unit 25 described in FIG. 2 can be realized, for example, by the control unit 13 executing the program. More specifically, each component can be realized by the control unit 17 executing the program stored in the storage unit 14. In addition, the necessary programs may be recorded in any nonvolatile recording medium and installed as necessary to realize each component. Each of these components is not limited to being implemented by software using a program, and may be implemented by any combination of hardware, firmware and software. Each of these components may also be implemented using user programmable integrated circuitry, such as, for example, FPGA (Field-Programmable Gate Array) or a microcomputer. In this case, the integrated circuit may be used to realize a program functioning as each of the above-described components. Thus, each component may be implemented in hardware other than a processor. The above is the same in other example embodiments to be described later.

In some embodiments, the learning device 1 may be configured by a plurality of devices. For example, the learning device 1 may include a device configured to perform the learning pre-processing, and a device configured to perform the learning processing of the second inference machine. In this case, the device configured to perform the learning processing of the second inference machine acquires the label information D4 generated by the device configured to perform the learning pre-processing and then performs the learning processing of the second inference engine. In this way, each device constituting the learning device 1 executes a pre-allocated processing by transmitting and receiving necessary data to and from one another.

(3) Examples of Congruence in Appearance and Mirror Symmetry

Next, the correspondence relation between the first label L1 and the second label L2 based on the congruence in appearance and mirror symmetry will be described as a specific example using a tennis court as an example of the reference object Ro subject to feature point extraction.

Figure 3:
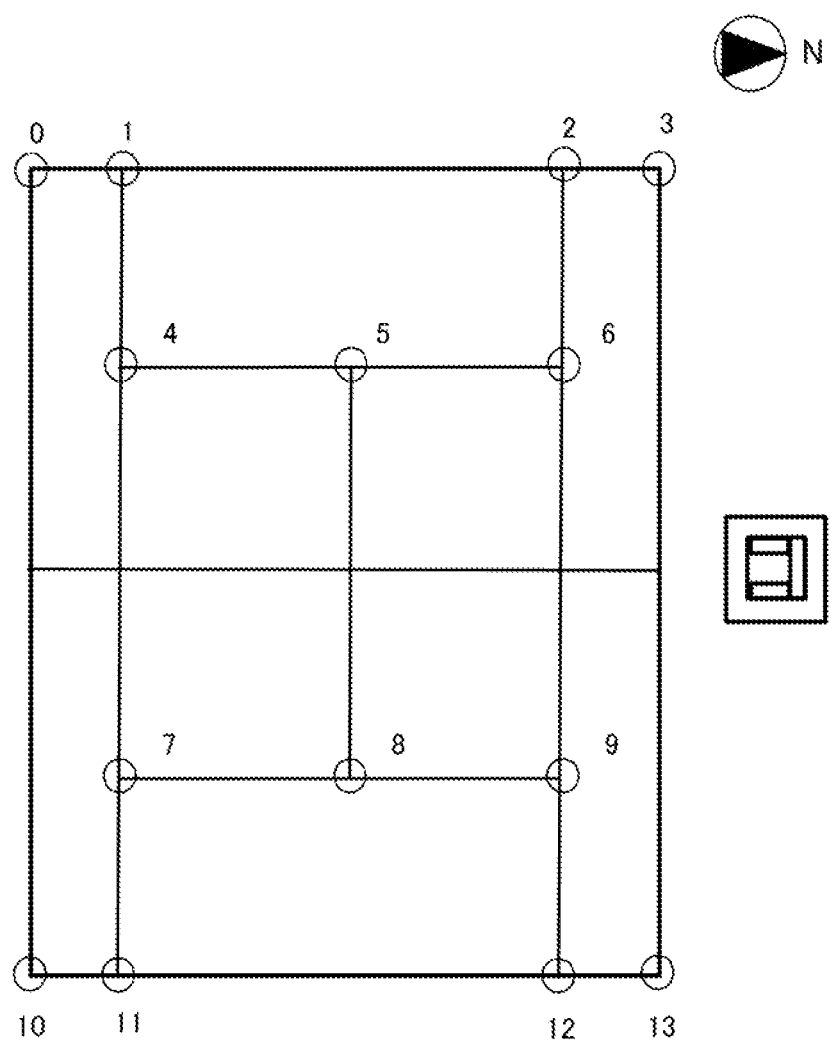
FIG. 3 is a bird's-eye view of the tennis court that is a target of feature point extraction.

FIG. 3 is a bird's-eye view of the tennis court subject to the feature point extraction. In FIG. 3, the positions of the feature points to be extracted are circled, and the first label L1 (here, "0" to "13") corresponding to each feature point is clearly shown. Further, FIGS. 4A to 4D are enlarged views of the first labels L1 "5", "6", "3", and "13", respectively. The images shown in FIGS. 4A to 4D are feature point images Imf of feature points whose first labels L1 are respectively "5", "6", "3", and "13" when the tennis court shown in FIG. 3 is imaged from directly above the object image Imo. In addition, in FIGS. 4A to 4D, the positions of feature points to be extracted are circled, respectively.

As shown in FIGS. 3, 4A, and 4B, the feature point whose first label L1 is "5" and the feature point whose first label L1 is "6" are apparently identical when viewed at viewpoints of 360° from the vicinity (strictly speaking, viewed from a restricted solid angle). Similarly, as shown in FIGS. 3, 4C, and 4D, the feature point whose first label L1 is "3" and the feature point whose first label L1 is "13" are apparently identical when viewed at viewpoints of 360° from the vicinity. Therefore, the congruence and symmetry determination unit 21 determines that the feature points whose first labels L1 are "5" and "6" and the feature points whose first labels L1 are "3" and "13" are congruent in appearance, respectively. Then, for the entire tennis court, the congruence and symmetry determination unit 21 recognizes groups (combinations) of feature points that are congruent in appearance to one another. Since a group of feature points corresponding to the first labels L1 "0", "3", "10", and "13" has a congruent relation in appearance, the second label definition unit 22 determines the second labels L2 of the feature points of the group to be the same value (here, "0"). Further, since a group of feature points corresponding to the first labels L1 "1", "2", "4", "5", "6", "7", "8", "9", "11", and "12" has a congruent-in-appearance property, the second label definition unit 22 determines the second labels L2 of the feature points of the group to be the same value (here, "1").

Therefore, in this case, the learning device 1 determines the number of the second labels L2 to be two. Therefore, the learning device 1 can suitably reduce the number of the second labels L2 corresponding to the number of second inference engines to be learned. Further, in this case, per one object image Imo, the number of training samples for which the second label L2 is "0" is four, and the number of learning samples for which the second label L2 is "1" is ten. Thus, the learning device 1 can suitably increase the number of training samples to be used for training the second inference engine for each second label L2 through the integration of labels based on congruence in appearance and mirror symmetry.

FIGS. 5A to 5D are enlarged views of the feature points whose first labels L1 are "5", "6", "3", and "13", respectively, in a case where the positions of the feature points to be extracted are defined more strictly than the case shown in FIG. 3.

In this case, since the feature points whose first labels L1 are "3" and "13" shown in FIGS. 5C and 5D are congruent in appearance by the rotation operation, it is possible to assign the same second labels L2 to them. On the other hand, as shown in FIGS. 5A and 5B, the feature points whose first labels L1 are "5" and "6" do not look congruent even if the rotation operation is performed, but have a mirror-symmetrical relation with each other, and therefore performing the mirror operation on either one of them causes them to be congruent in appearance.

Figure 6:
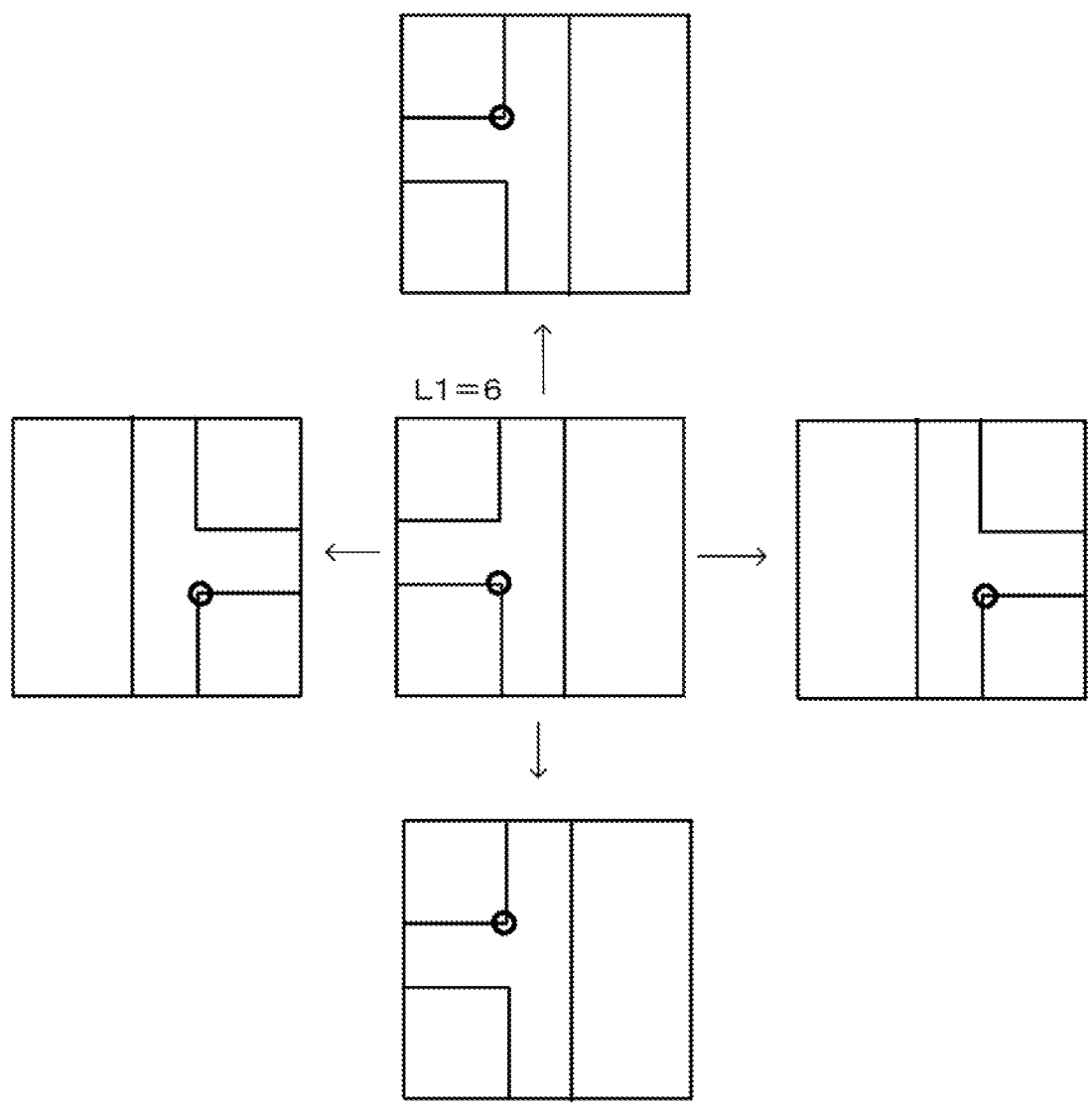
FIG. 6 illustrates a mirror image generated by performing a mirror operation on each of the vertical and horizontal axes of an image of the first label "6" shown in FIG. 5B.

FIG. 6 illustrates a mirror image generated by performing a mirror operation on each of the vertical and horizontal axes of an image of the first label "6" shown in FIG. 5B. As shown in FIG. 6, an image (also referred to as "mirror image") generated by performing a mirror operation on the image of the first label "6" around an arbitrary axis has a congruent relation in appearance to the image of the first label L1 "5". Therefore, the congruence and symmetry determination unit 21 determines that the feature points whose first labels L1 are "5" and "6" are the mirror symmetry, and the second label definition unit 22 applies the same second label L2 to them. As described above, the learning device 1 can reduce the number of the second labels L2 and suitably increase the number of training samples for each second label L2 by assigning the same second label L2 to feature points having a mirror symmetry relation to one another.

Figure 7A:
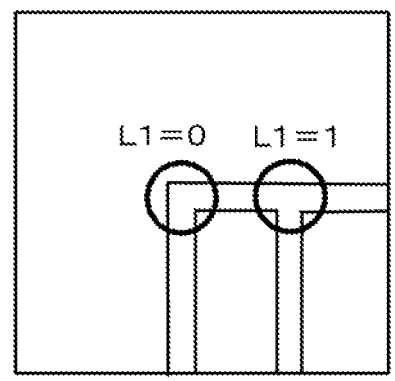
FIG. 7A illustrates the feature point image generated for the feature point whose first label is "0".
Figure 7B:
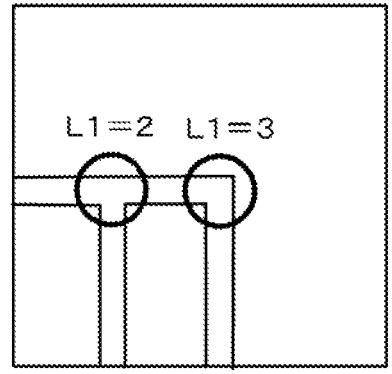
FIG. 7B illustrates the feature point image generated for the feature point whose first label is "3".

FIGS. 7A and 7B show feature point images Imf with a low enlargement ratio, which are generated based on the object image Imo obtained by imaging the tennis court shown in FIG. 3. The feature point image Imf shown in FIG. 7A is a feature point image Imf generated for a feature point whose first label L1 is "0", and includes another feature point (here, the feature point whose first label L1 is "1") adjacent to each other due to the low enlargement ratio.

Similarly, the feature point image Imf shown in FIG. 7B is a feature point image Imf generated for a feature point whose first label L1 is "3", and includes another feature point (in this case, the feature point whose first label L1 is "2") adjacent to each other due to the low enlargement ratio. Incidentally, such a low enlargement rate is caused, for example, by a constraint due to the distance between the camera which imaged the object image Imo and the reference object Ro, or a constraint due to the magnitude of the blur of the processing in the first inference engine.

In this case, the congruence and symmetry determination unit 21 determines that the feature point images Imf shown in FIG. 7A and FIG. 7B have the mirror symmetry. Therefore, in this case, the second label definition unit 22 assigns the same second label L2 to the feature point whose first label L1 is "0" and the feature point whose first label L1 is "3". As described above, even when a plurality of feature points are included in the feature point image due to the low enlargement ratio, the learning device 1 can determine the congruence in appearance and the mirror symmetry for the surrounding region of each feature point within a range corresponding to the enlargement ratio, and suitably reduce the number of the second labels L2.

(4) Inference Based on Second Inference Engine

Figure 8:
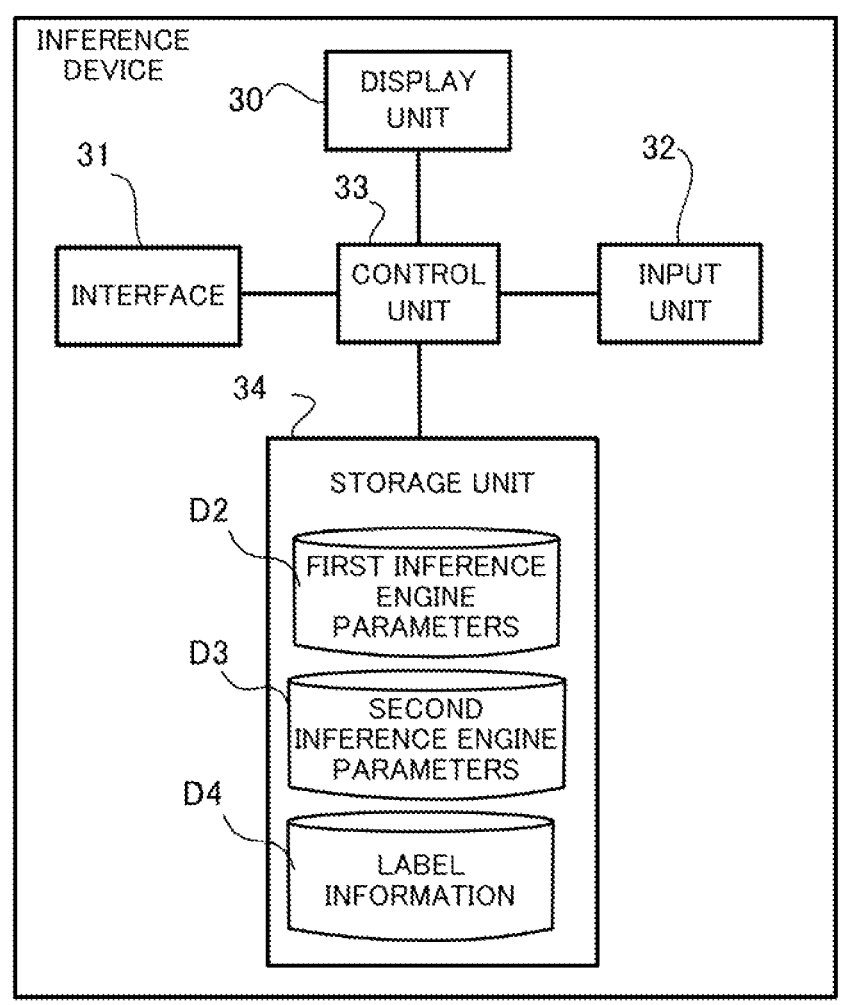
FIG. 8 illustrates a schematic configuration of an inference device configured to perform an inference using the second inference engine parameters.

Next, the inference using the second inference engine learned by the learning device 1 will be described. FIG. 8 shows a schematic configuration of an inference device 3 configured to perform inference using the second inference engine parameters D3 generated by the learning device 1.

The inference device 3 is configured to be able to refer to: the first inference engine parameters D2; and the second inference engine parameters D3 and the label information D4 which are generated by the learning device 1. Then, the inference device 3 infers a combination of the position and the first label of each feature point of the reference object Ro in the object image Imo when the object image Imo captured by a camera is inputted, and performs predetermined processing according to the inference result. For example, based on the inference result and the positional relation among feature points, the inference device 3 recognizes the position, shape, orientation, and the like of the reference object Ro of interest.

It is noted that the inference device 3 may be integrated with the learning device 1 or may be any device separated from the learning device 1. In the latter example, the inference device 3 may be an AR device that is wearable on the user's head to achieve augmented reality. In this case, the inference device 3 realizes augmented reality by overlaying visual information on the real landscape during sports viewing or theater (including concerts) viewing. Since such an AR device needs to perform the calibration process for associating the real world space with the space recognized by the inference device 3, it is necessary to accurately perform feature point extraction on the reference object Ro which functions as a reference.

The inference device 3 mainly includes a display unit 30, an interface 31, an input unit 32, a control unit 33, and a storage unit 34. The display unit 30 may be a display or may be a combination, in an AR device, of a light source unit configured to emit light for displaying the visual information superimposed on the actual landscape and an optical element configured to reflect the light to reach the wearer's eyes.

The interface 31 performs an interface operation for acquiring the object image Imo with which the inference device 3 performs the inference. The interface 31 may be an interface for receiving the object image Imo by wired or wireless communication with a camera configured to image the object image Imo, or may be a communication interface for receiving the object image Imo from an external device. The interface 31 may also be a hardware interface for reading the object image Imo from a storage medium or the like storing one or more object images Imo.

The control unit 33 includes one or more processors such as a CPU, a GPU, and a quantum processor, and a volatile memory that functions as a work memory of the processors, and performs overall control of the inference device 3.

The storage unit 34 includes a nonvolatile memory in which the control unit 33 stores various information necessary for learning. The storage unit 34 stores the first inference engine parameters D2, the second inference engine parameters D3, and the label information D4.

The configuration of the inference device 3 shown in FIG. 8 is an example, and various changes may be applied to this configuration. For example, instead of storing the first inference engine parameters D2, the second inference engine parameters D3, and the label information D4, the inference device 3 may acquire at least one of them from an external device connected to the inference device 3 by wire or wireless communication via the interface 31. Similarly, the inference device 3 may be connected by wired or wireless communication via the interface 31 to a display device or an input device configured as an external device instead of being equipped with the display unit 30 and the input unit 32. Further, the inference device 3 may be configured by a plurality of devices.

Figure 9:
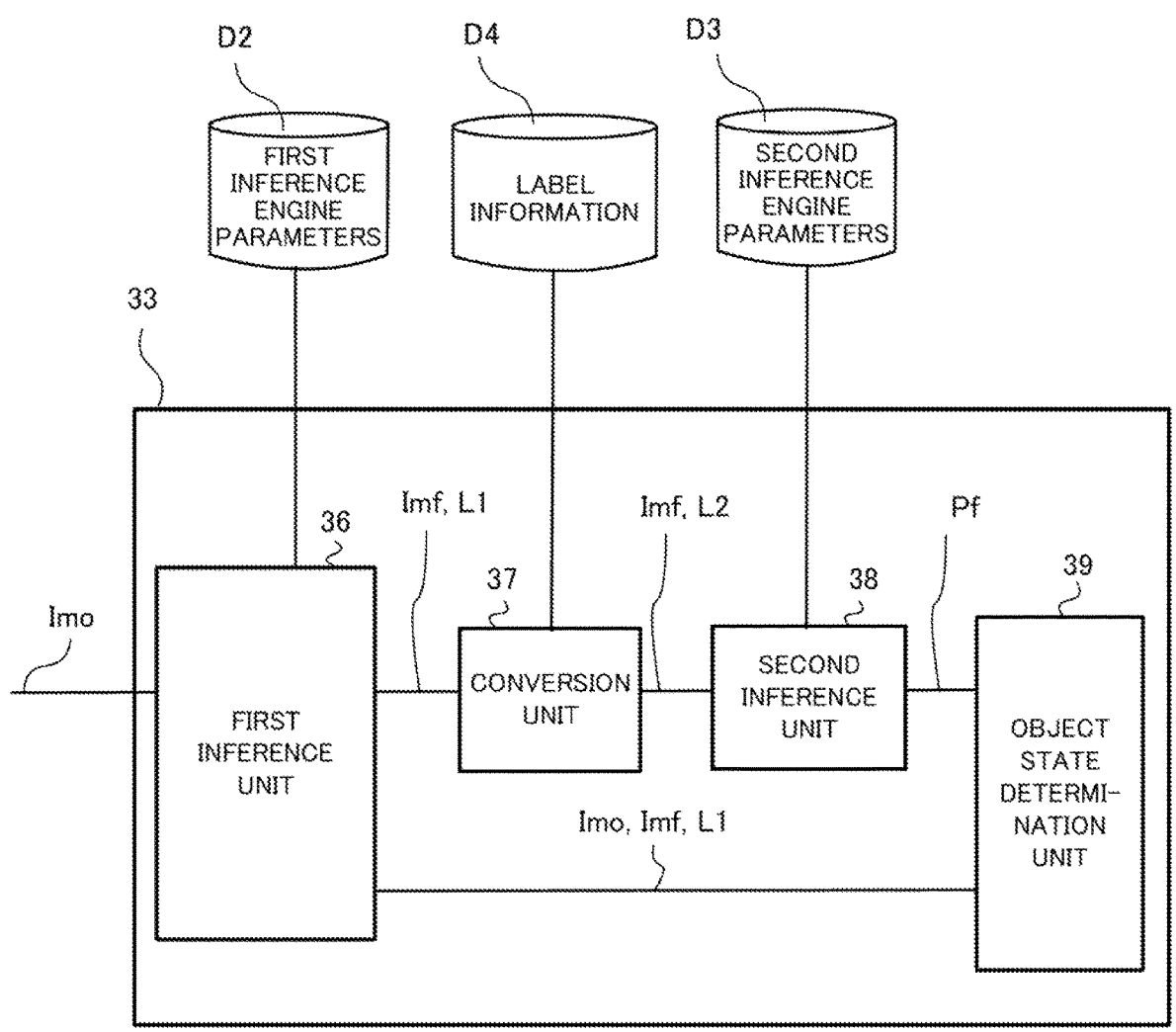
FIG. 9 is a functional block diagram of a control unit of the inference device.

FIG. 9 is an example of a functional block showing the functional configuration of the control unit 33. The control unit 33 functionally includes a first inference unit 36, a conversion unit 37, a second inference unit 38, and an object state determination unit 39.

The first inference unit 36 inputs the object image Imo to the first inference engine configured based on the first inference engine parameters D2 when receiving the object image Imo via the interface 31, and acquires the inference result outputted from the first inference engine. Then, the first inference unit 36 generates, for each detected feature point, a combination of the feature point image Imf and the first label L1 based on the acquired inference result. For example, the process performed by the first inference unit 36 is the same as the processing performed by the first inference unit 23 of the learning device 1.

Based on the label information D4, the conversion unit 37 converts each first label L1 supplied from the first inference unit 36 into the second label L2, and supplies the combination of the converted second label L2 and the feature point image Imf to the learning unit 25. In this case, in some embodiments, when the conversion unit 37 specifies, based on the label information D4, a feature point image Imf corresponding to a feature point which is a mirror symmetry with another feature point among the feature points to which the same second label L2 is assigned, the conversion unit 37 supplies the second inference unit 38 with a mirror image generated by applying a mirror operation to the feature point image Imf. Thus, the conversion unit 37 suitably supplies feature point images Imf all of which are congruent in appearance to one another for each second label L2 to the second inference unit 38.

The second inference unit 38 acquires, from the second inference unit parameters D3, parameters necessary for configuring the second inference engine corresponding to the second label L2 supplied from the conversion unit 37, and inputs the feature point image Imf supplied from the conversion unit 37 to the second inference engine configured based on the acquired parameters. Then, the second inference unit 38 recognizes the position of the feature point in the feature point image Imf based on the inference result outputted from the second inference engine, and supplies information (also referred to as "feature point position information Pf") indicating the position of the recognized feature point to the object state determination unit 39. When the second inference engine is configured to output the coordinate position of the feature point in the feature point image Imf as the inference result, the second inference unit 38 supplies the feature point position information Pf indicating the coordinate position to the object state determination unit 39. In contrast, when the second inference engine is configured to output the reliability map of the feature points in the feature point image Imf as the inference result, the second inference unit 38 supplies the feature point position information Pf indicating the coordinate position on the feature point image Imf having the highest reliability to the object state determination unit 39.

The object state determination unit 39 determines the state of the reference object Ro based on: the feature point position information Pf supplied from the second inference unit 38; the object image Imo supplied from the first inference unit 36; the feature point image Imf; and the first label L1. For example, the object state determination unit 39 recognizes the position of each feature point in the object image Imo based on the feature point position information Pf, the object image Imo, and the feature point image Imf. Further, the object state determination unit 39 recognizes the first label to which the each feature point belongs based on the first label L1 supplied from the first inference unit 36. Accordingly, the object state determination unit 39 recognizes combinations of the position on the object image Imo and the first label L1 for all feature points detected by the first inference unit 36. Thus, the inference device 3 can accurately infer the position and label of each feature point of the reference object Ro shown in the object image Imo.

Next, a specific example of the process executed by the inference device 3 will be described with reference to FIGS. 10A and 10B.

Figure 10A:
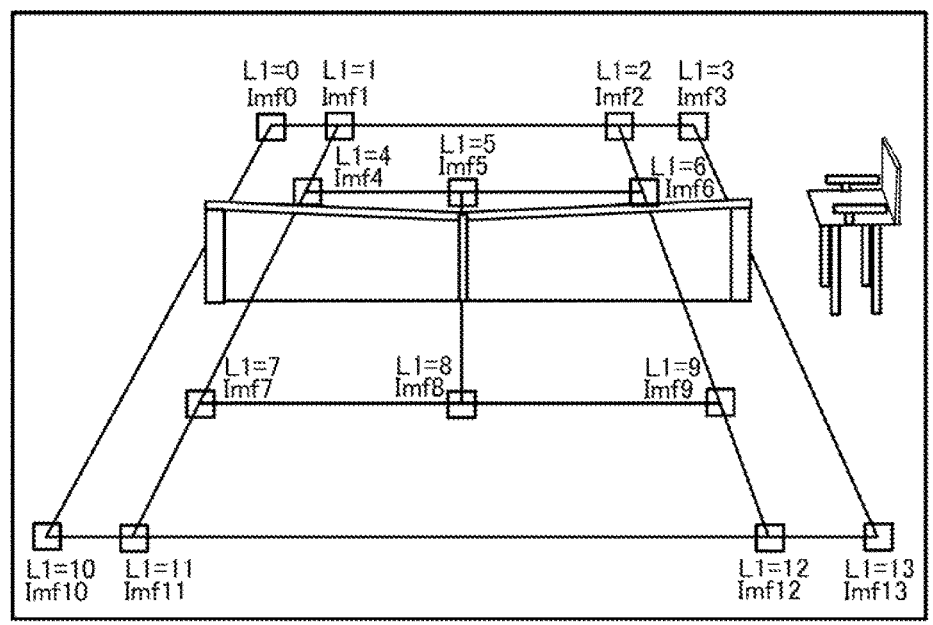
FIG. 10A illustrates an object image in which the result of the process by the first inference unit is clearly shown in the extraction of feature points of a tennis court.
Figure 10B:
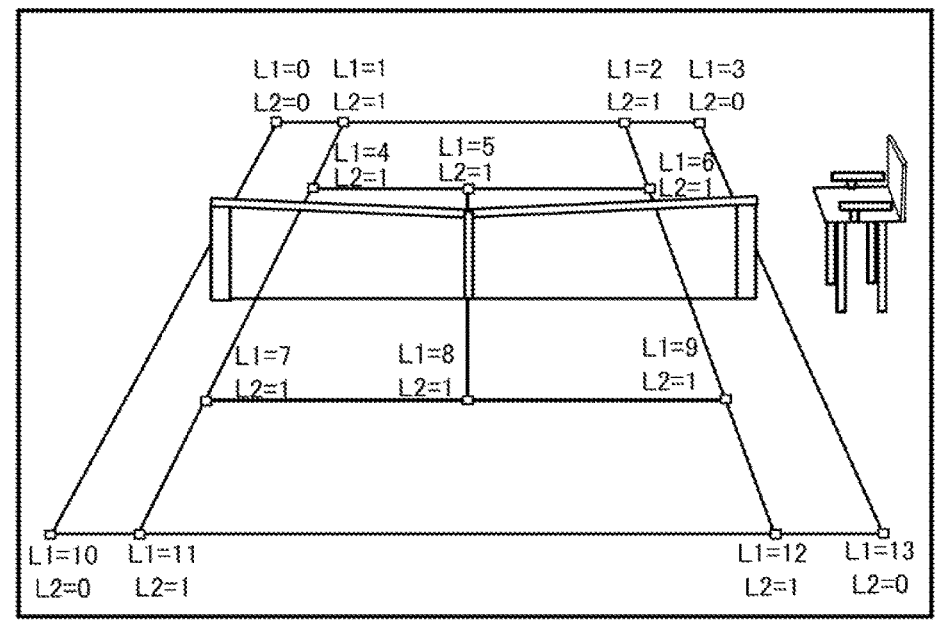
FIG. 10B illustrates an object image in which the second labels and marks indicative of positions estimated by the second inference unit are clearly indicated, respectively.

FIG. 10A illustrates an object image Imo in which the result of the process by the first inference unit 36 is clearly shown in the extraction of feature points of a tennis court. FIG. 10A clearly indicates, as a processing result by the first inference unit 36, the first label L1 (here, "0" to "13") corresponding to each feature point existing in the object image Imo and a rectangular frame corresponding to the feature point image Imf ("Imf0" to "Imf13") set for each feature point. Further, FIG. 10B illustrates the object image Imo in which the second labels L2 and marks indicative of positions indicated by the feature point position information Pf are clearly indicated, respectively. Here, the second label L2 is set to "0" or "1".

As shown in FIG. 10A, when the object image Imo is input, the first inference unit 36 configures the first inference engine based on the first inference engine parameters D2. Then, based on the inference result obtained by inputting the object image Imo to the first inference engine, the first inference unit 36 generates a combination of and the feature point image Imf, which indicates the rough position of each feature point to be extracted in the tennis court, and the corresponding first label L1.

Further, based on the label information D4 generated based on at least one of the congruence in appearance or the mirror symmetry regarding the tennis court, the conversion unit 37 determines each second label L2 of feature points whose first labels L1 are "0", "3", "10", and "13" to be "0". Similarly, the conversion unit 37 determines each second label L2 of feature points whose first label L1 are "1," "2," "4," "5," "6," "7," "8," "9," "11," and "12" to be "1."

Then, the second inference unit 38 configures the second inference engine for each second label L2 based on the second inference unit parameters D3 generated in advance for each second label L2. Then, the second inference unit 38 selects the second inference engine based on the second label L2 for each feature point and inputs the feature point image Imf corresponding to the each feature point to the selected second inference engine. Then, the second inference unit 38 generates, based on the inference result outputted by the second inference engine, feature point position information Pf indicating the position of the each feature point. Then, the object state determination unit 39 recognizes the combination of the exact position of the each feature point and the first label L1 based on the feature point position information Pf and the first label L1 inferred by the first inference unit 36.

Accordingly, the inference device 3 can accurately infer the position and the label of each feature point of the reference object Ro for a given object image Imo by using the second inference engine parameters D3 and the label information D4 generated by the learning device 1.

(5) Process Flow

Figure 11:
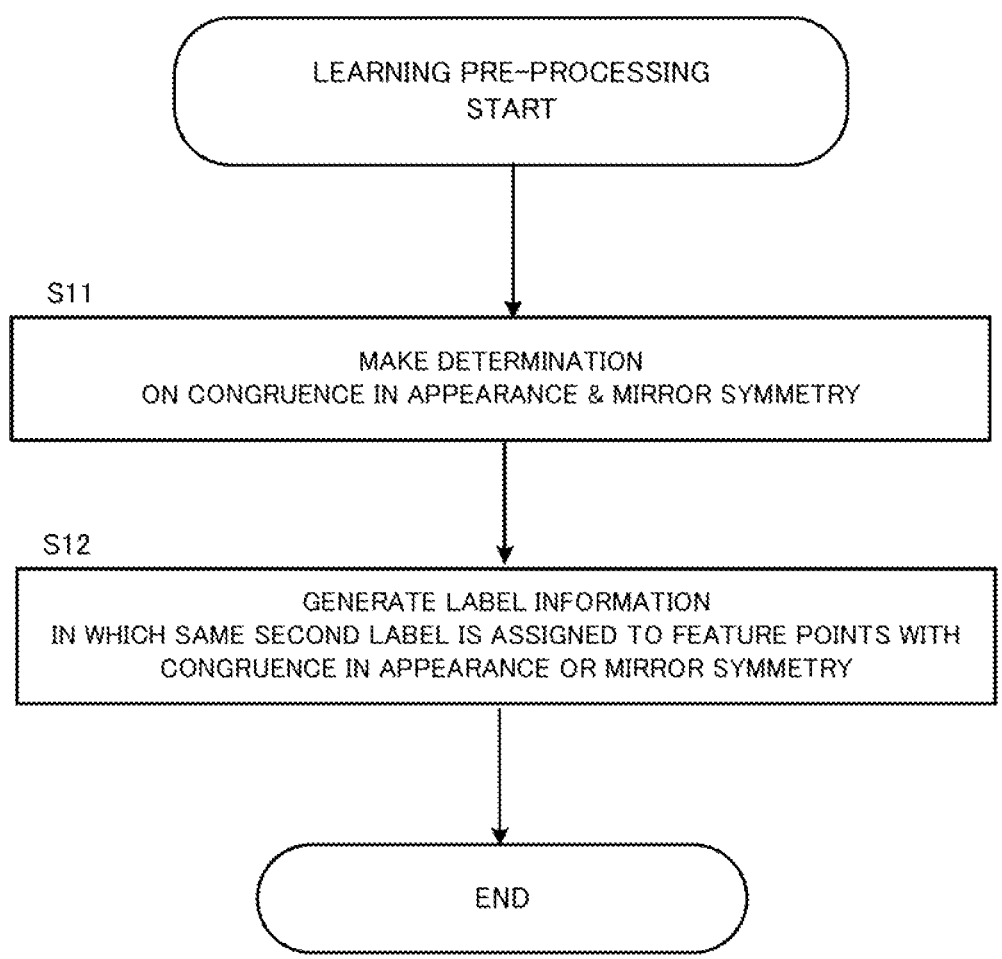
FIG. 11 is an example of a flowchart showing the procedure of the learning pre-processing performed by the learning device.

FIG. 11 is an example of a flowchart illustrating a procedure of learning pre-processing performed by the learning device 1.

First, the congruence and symmetry determination unit 21 of the learning device 1 makes a determination on whether or not there is a congruence relation in appearance and there is a mirror symmetry relation in the reference object Ro subject to feature point extraction (step S11). In this case, the congruence and symmetry determination unit 21 may make the determination on presence or absence of the congruence in appearance and mirror symmetry of the reference object Ro by receiving the user input by the input unit 12, or may make the above-described determination through an analysis using the three-dimensional model or the orthographic image of the reference object Ro generated based on the training data D1 or the like.

Next, the second label definition unit 22 of the learning device 1 generates the label information D4 in which the same second label L2 is assigned to the feature points determined to have a congruence relation in appearance or mirror symmetry relation at step S11 (step S12). Accordingly, the learning device 1 suitably reduces the number of labels to be used for the inference in the second inference engine by defining the second labels L2 based on presence or absence of the congruence in appearance and the mirror symmetry.

Figure 12:
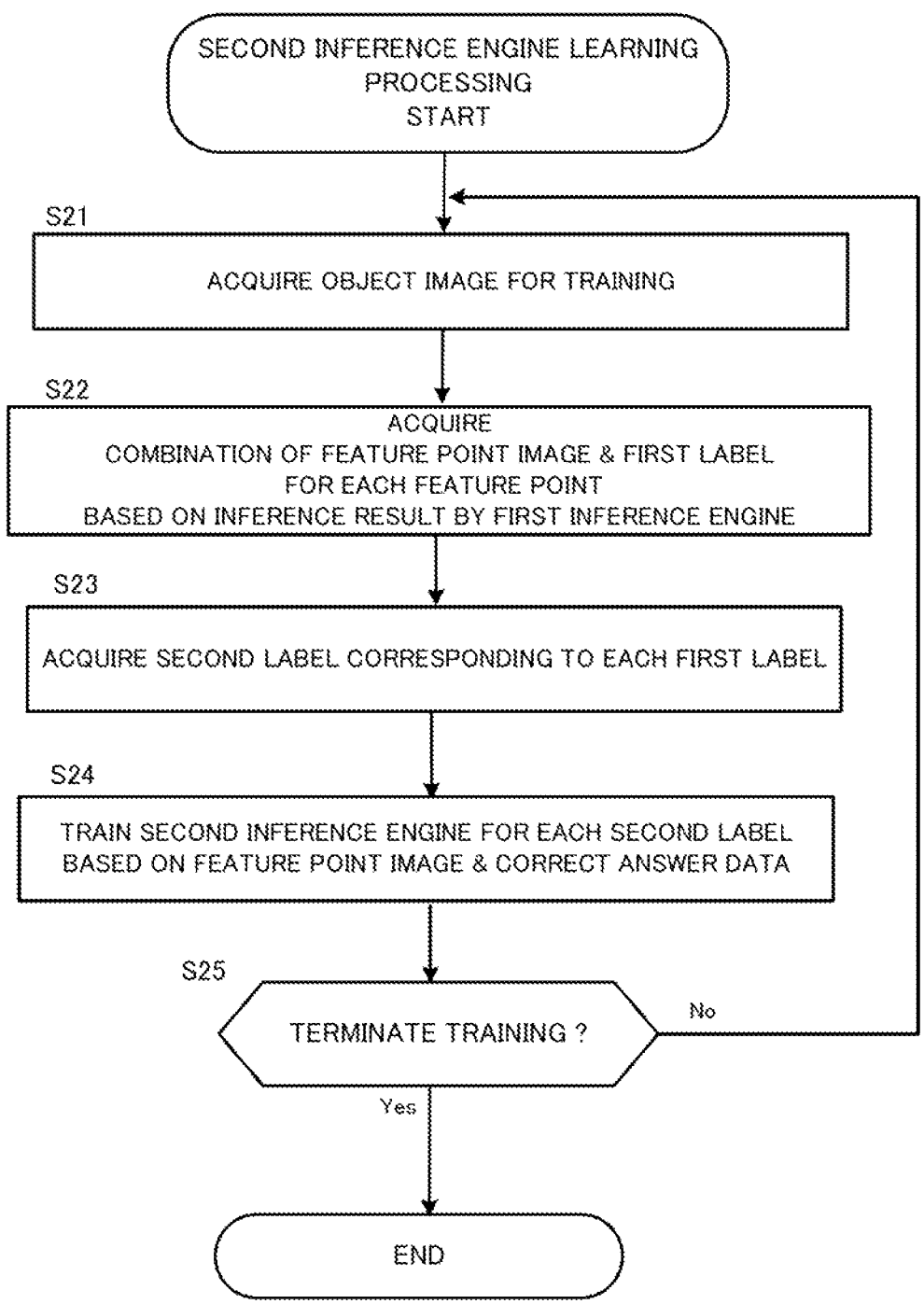
FIG. 12 is an example of a flowchart showing the procedure of the learning processing of the second inference engine performed by the learning device.

FIG. 12 is an example of a flowchart illustrating a procedure of learning processing of the second inference engine executed by the learning device 1.

First, the learning device 1 acquires the object image Imo for training from the training data D1 (step S21). In this case, for example, the learning device 1 acquires any non-training (i.e., not yet used for training) object image Imo registered as the training data D1 from the storage unit 14. In another example, the learning device 1 acquires the object image Imo specified by the user input by the input unit 12 from the storage unit 14.

Next, the first inference unit 23 of the learning device 1 acquires the combination of the feature point image Imf and the first label L1 for each feature point from the object image Imo based on the inference result outputted by the first inference engine configured with reference to the first inference engine parameters D2 (step S22). In this case, the first inference unit 23 acquires the combination of the feature point image Imf and the first label L1 for each feature point based on inference result relating to the position of each feature point and the first label L1 thereof obtained by inputting the object image Imo to the first inference engine.

Next, the conversion unit 24 acquires the second label L2 corresponding to each first label L1 (step S23). In this case, the conversion unit 24 acquires second labels L2 obtained by integrating the first labels L1 based on at least one of the congruence in appearance or the mirror symmetry with reference to the label information D4. In addition, in the case where the label information D4 includes additional information indicating a mirror symmetry relation, the conversion unit 24 performs a mirror operation on some of feature point images Imf so that all feature point images Imf for each second label L2 have a congruent relation in appearance to one another.

Next, the learning unit 25 trains the second inference engine for each second label L2 based on the feature point image Imf acquired at step S22 and the correct answer data Cd indicating the correct answer position of each feature point (step S24). Accordingly, the learning unit 25 generates the second inference engine parameters D3 necessary for configuring the second inference engine for each second label L2. In this case, the learning unit 25 may perform training of the second inference engine for the reduced number of labels reduced based on at least one of the congruence in appearance or the mirror symmetry, and may suitably increase the number of training samples for each second inference engine.

Then, the learning device 1 determines whether or not the training of the second inference engine should be terminated (step S25). For example, the learning device 1 determines that the training should be terminated when a user input or the like indicating that the training should be terminated is detected, or when the training using all the object images Imo specified as the training data is completed. When it is determined that the training of the second inference engine should be terminated (step S25; Yes), the learning device 1 terminates the processing of the flowchart. On the other hand, when it is determined that the training should not be terminated (step S25; No), the learning device 1 goes back to the process at step S21. In this case, the learning device 1 acquires the object image Imo for training that has not been used for training from the training data D1 and executes a series of processing again.

Figure 13:
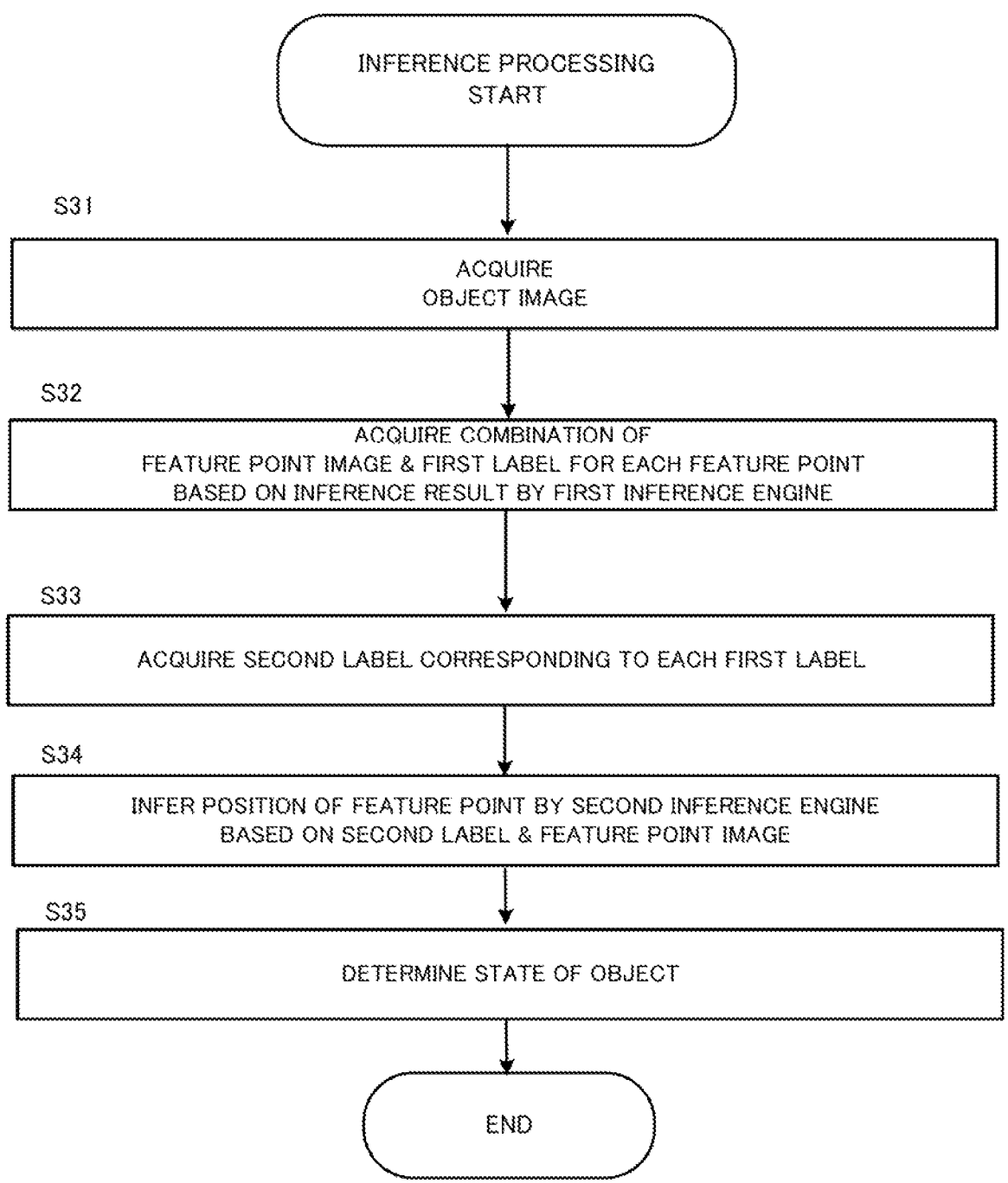
FIG. 13 is an example of a flowchart showing the procedure of the inference processing performed by the inference device.

FIG. 13 is an example of a flowchart illustrating a procedure of the inference processing performed by the inference device 3.

First, the inference device 3 acquires the object image Imo in which the reference object Ro to be the target of the feature point extraction is imaged from the camera or other external device via the interface 31 (step S31).

Then, the first inference unit 36 of the inference device 3 acquires the combination of the feature point image Imf and the first label L1 for each feature point from the object image Imo based on the inference result obtained by inputting the object image Imo to the first inference engine configured with reference to the first inference engine parameters D2 (step S32).

Then, the conversion unit 37 of the inference device 3 acquires the second label L2 corresponding to each first label L1 (step S33). In this case, the conversion unit 37 acquires the second labels L2 obtained by integrating the first labels L1 based on at least one of the congruence in appearance or the mirror symmetry with reference to the label information D4. In addition, in the case where the label information D4 includes additional information indicating the mirror symmetry, the conversion unit 37 performs a mirror operation on some of feature point images Imf so that all feature point images Imf for each second label L2 have a congruent relation in appearance to one another.

Next, the second inference unit 38 infers the position of each feature point by the second inference engine based on the second label L2 and the feature point image Imf (step S34). In this case, the second inference unit 38 configures the second inference engine corresponding to the second label L2 of the each feature point based on the second inference engine parameters D3, and by inputting the feature point image Imf of the each feature point to the second inference engine, infers the position of the accurate each feature point in the feature point image Imf thereby to generate the feature point position information Pf indicating the position.

Then, the object state determination unit 39 determines the state of the target reference object Ro (step S35). In this case, the object state determination unit 39 recognizes the combination of the exact position of every feature point included in the object image Imo acquired at step S21 and the first label L1 to which the every feature point belongs based on the processing result generated at step S31 to step S34.

Second Example Embodiment

Figure 14:
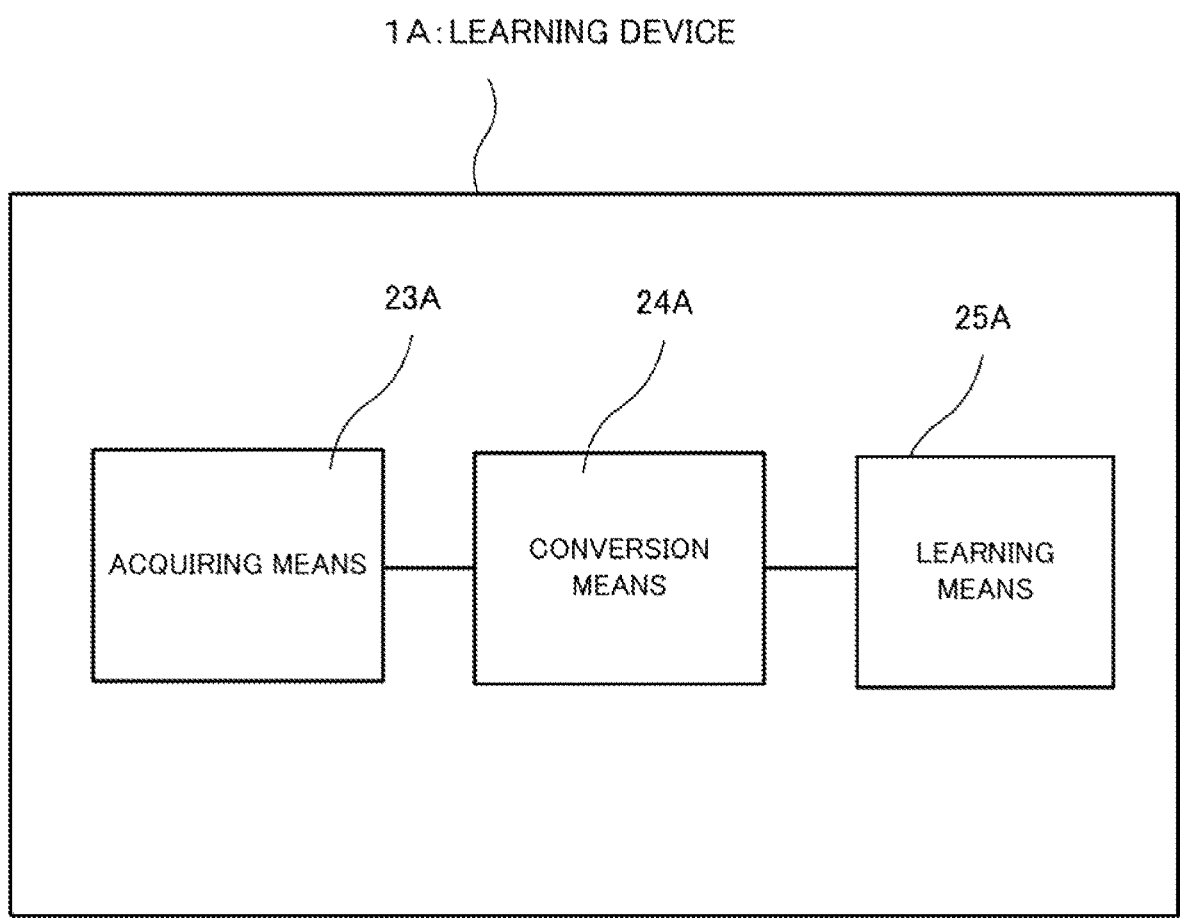
FIG. 14 illustrates a schematic configuration of a learning device according to a second example embodiment.

FIG. 14 shows a schematic configuration of a learning device 1A according to a second example embodiment. As shown in FIG. 14, the learning device 1A includes an acquiring means 23A, a conversion means 24A, and a learning means 25A.

The acquiring means 23A is configured to acquire a combination of a first label that is a unique label for each feature point of an object and a feature point image in which a feature point corresponding to the first label is imaged. In the first example, the acquiring means 23A may be the first inference unit 23 in the first example embodiment. In the second example, the acquiring means 23A may acquire a combination of the first label that is a unique label for each feature point of the object and the feature point image in which the feature point corresponding to the first label is imaged from another device configured to perform processing corresponding to the first inference unit 23 in the first example embodiment. In the third example, the acquiring means 23A may acquire the combination thereof by reading from a storage device configured to store combinations of a first label and a feature point image corresponding to the first label.

A supplemental explanation will be given of the second example of the acquiring means 23A. In the second example, in addition to the training data D1, data called accuracy verification data (Validation data) used to obtain the approximate learning progress of the first inference engine is also prepared. Generally, the accuracy verification data is different from the training data D1. Then, the accuracy of the first inference engine is clarified by applying the accuracy verification data to the first inference engine, and the rectangular size of the feature point image is decided. This rectangular size also depends on the size of each feature point relative to the object image Imo to be inputted. In addition, based on the accuracy obtained by the accuracy verification by the accuracy verification data, data augmentation by intentionally shifting the center position of the feature point image corresponding to the first label (to prevent the feature point from always being in the center of the image) or by intentionally expanding or scaling down the image is also performed. These expansion, scale down, and shifting may be executed based on randomly generated numerical values. The above-described process in the second example may be executed by "another device", or may be executed by the learning device 1A.

The conversion means 24A is configured to convert the first label to a second label that is set to a same label for feature points of the object with at least one of congruence relation in appearance or mirror symmetry relation to one another. Examples of the conversion means 24A include the conversion unit 24 according to the first example embodiment.

The learning means 25A is configured to learn an inference engine based on the second label, the feature point image, and correct answer data regarding a position of the feature point, the inference engine being configured to perform an inference on the position of the feature point included in an image that is inputted to the inference engine. Examples of the above-described inference device include the second inference engine in the first example embodiment and examples of the learning means 25A include the learning unit 25 in the first example embodiment.

Figure 15:
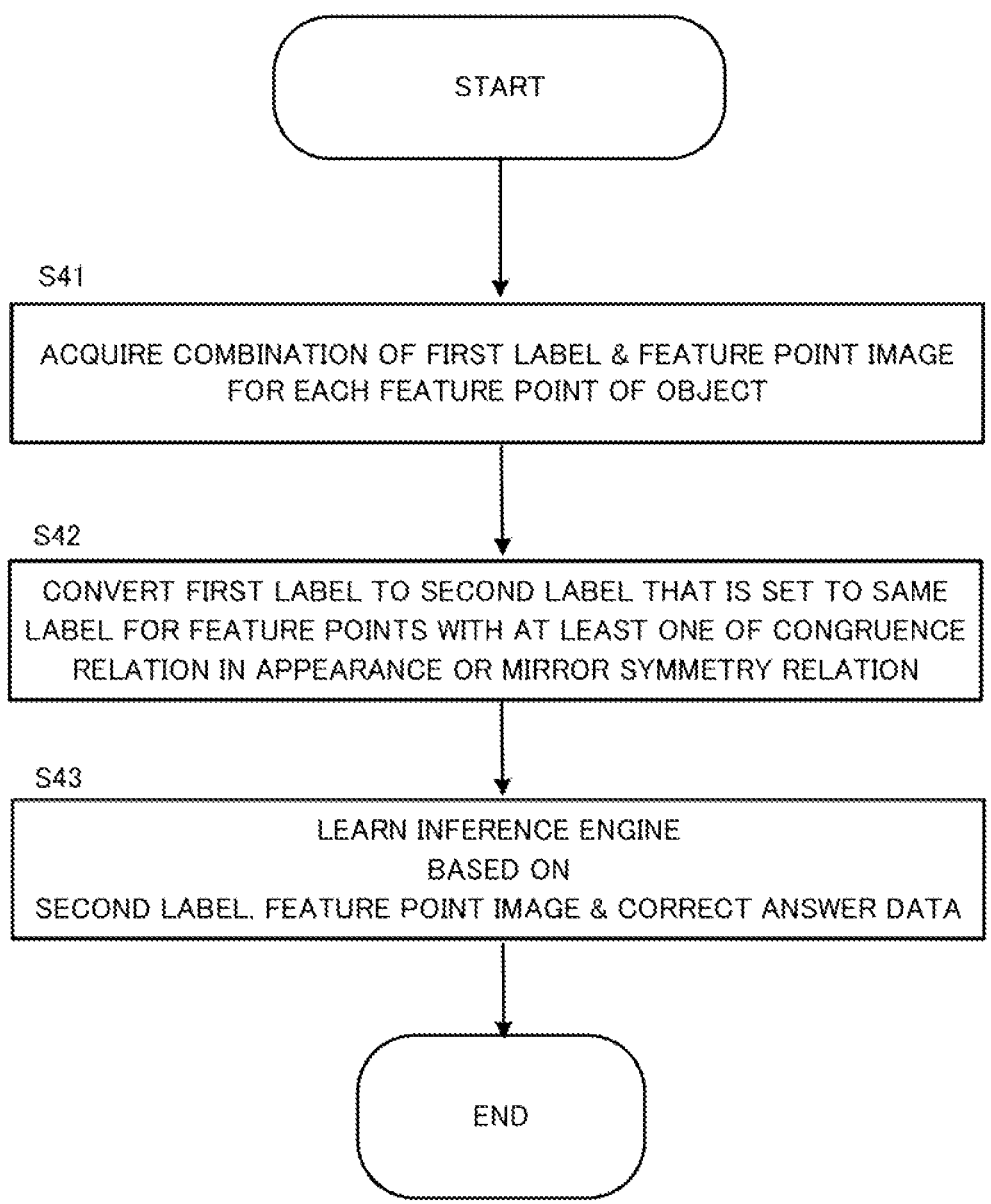
FIG. 15 is an example of a flowchart showing a procedure of the process performed by the learning device in the second example embodiment.

FIG. 15 is an example of a flowchart executed by the learning device 1A in the second example embodiment. The acquiring means 23A acquires a combination of a first label that is a unique label for each feature point of an object and a feature point image in which a feature point corresponding to the first label is imaged (step S41). Then, the conversion means 24A converts the first label to a second label that is set to a same label for feature points of the object with at least one of congruence relation in appearance or mirror symmetry relation to one another (step S42). Then, the learning means 25A learns an inference engine based on the second label, the feature point image, and correct answer data regarding a position of the feature point, the inference engine being configured to perform an inference on the position of the feature point included in an input image that is inputted to the inference engine (step S43).

Figure 16:
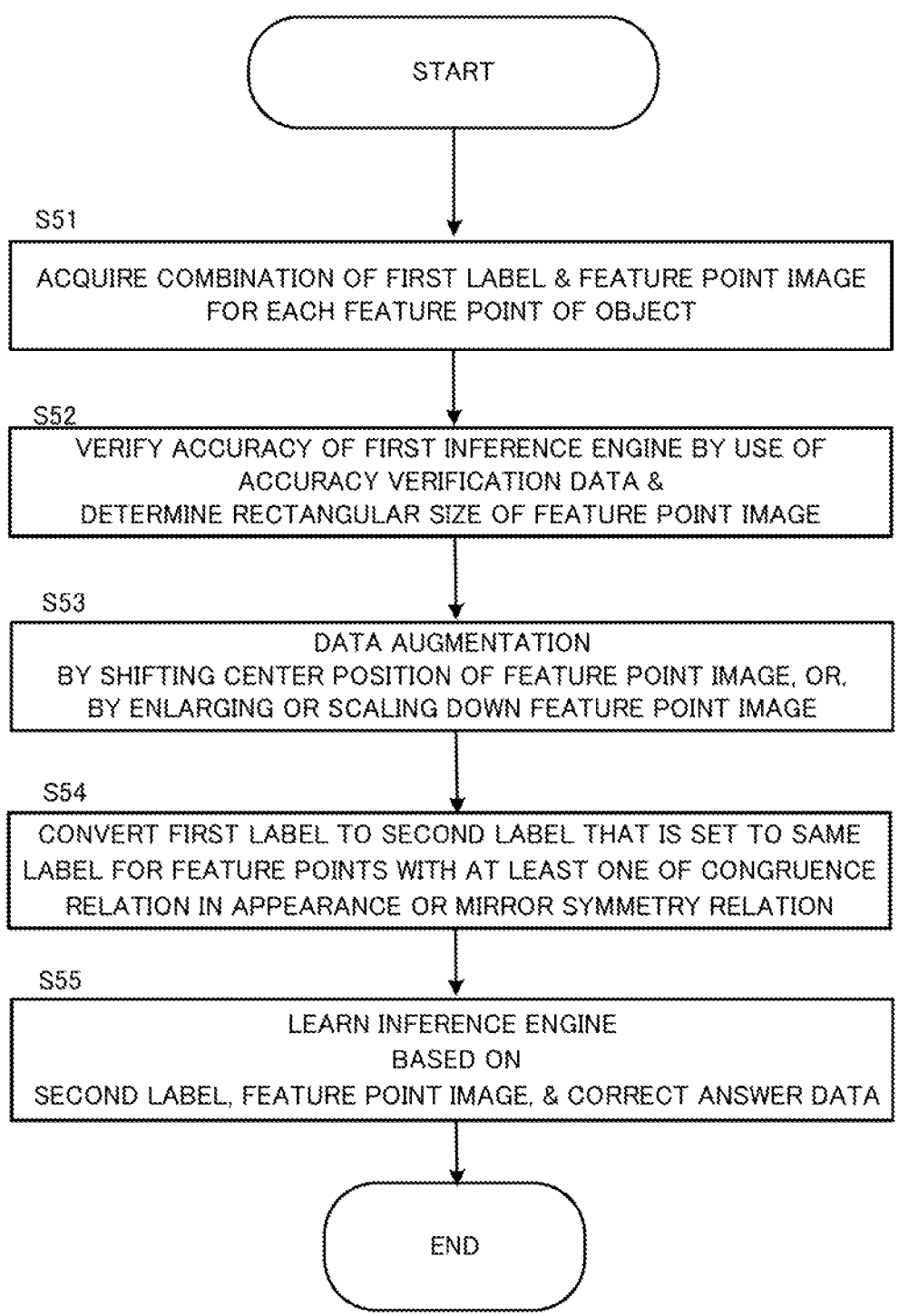
FIG. 16 is another example of a flowchart showing a procedure of the process performed by the learning device in the second example embodiment.

FIG. 16 is an example of a flowchart executed by the learning device 1A in the case where the process described in the above-described supplementary explanation relating to the second example of the acquiring means 23A is performed. The acquiring means 23A acquires a combination of a first label unique to each feature point of the object and a feature point image in which the feature point corresponding to the first label are imaged (step S51). Then, the learning device 1A verifies the accuracy of the first inference engine by applying the accuracy verification data to the first inference engine, and determines a rectangular size and the like of the feature point image (step S52). Further, the training device 1A performs the data augmentation by intentionally shifting the center position of the feature point image corresponding to the first label and/or intentionally enlarging and scaling down the feature point image (step S53). The process at step S52 and step S53 may be executed after the process at step S54. The conversion means 24A converts the first label to a second label that is set to a same label for feature points of the object with at least one of congruence relation in appearance or mirror symmetry relation to one another (step S54). Then, the learning means 25A learns an inference engine based on the second label, the feature point image, and correct answer data regarding a position of the feature point, the inference engine being configured to perform an inference on the position of the feature point included in an input image that is inputted to the inference engine (step S55).

According to the second example embodiment, the learning device 1A can suitably reduce the number of the second labels to be used for the inference engine and suitably increase the number of training data per label.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments (including modifications, the same shall apply hereinafter) described above can be described as, but not limited to, the following Supplementary Notes.

[Supplementary Note 1]

A learning device comprising:

an acquiring means configured to acquire a combination of a first label that is a unique label for each feature point of an object and a feature point image in which a feature point corresponding to the first label is imaged;

a conversion means configured to convert the first label to a second label that is set to a same label for feature points of the object with at least one of a congruence relation in appearance or a mirror symmetry relation to one another; and a learning means configured to learn an inference engine based on the second label, the feature point image, and correct answer data regarding a position of the feature point, the inference engine being configured to perform an inference on the position of the feature point included in an image that is inputted to the inference engine.

[Supplementary Note 2]

The learning device according to Supplementary Note 1, wherein the acquiring means is configured to acquire the combination by inputting an object image in which the object is imaged to a first inference engine, the first inference engine being configured to perform, based on the object image inputted to the first inference engine, an inference on the position of the feature point of the object and the first label corresponding to the feature point.

[Supplementary Note 3]

The learning device according to Supplementary Note 1 or 2, wherein the conversion means is configured to convert the first label to the second label based on label information indicating a correspondence between the first label and the second label.

[Supplementary Note 4]

The learning device according to Supplementary Note 3, further comprising:

a congruence and symmetry determination means configured to make a determination on a combination of the feature points of the object with at least one of the congruence relation in appearance or the mirror symmetry relation; and a second label definition means configured to generate label information based on a result of the determination by the congruence and symmetry determination means.

[Supplementary Note 5]

The learning device according to any one of Supplementary Notes 1 to 4, wherein the conversion means is configured to convert, in a case where there are a first feature point and a second feature point of the object with the mirror symmetry relation, the feature point image corresponding to the second feature point by mirror operation, and wherein the learning means is configured to learn the inference engine configured to perform an inference on a second label to which the first feature points and the second feature points correspond based on the feature point image corresponding to the first feature point and the feature point image converted by the conversion means.

[Supplementary Note 6]

The learning device according to any one of Supplementary Notes 1 to 5, wherein the learning means is configured to learn the inference engine for each second label based on the feature point image and the correct answer data for the each second label.

[Supplementary Note 7]

The learning device according to any one of Supplementary Notes 1 to 6, wherein the learning means is configured to generate one or more feature point images obtained by at least one of shifting a center position of the feature point image or enlarging or scaling down the feature point image and add the feature point images to data to be used for leaning the inference engine.

[Supplementary Note 8]

An inference device comprising:

a first inference means configured to perform, in a case where an object image in which an object is imaged is inputted thereto, a first inference on positions of feature points of the object and first labels corresponding to the feature points;

a conversion means configured to convert the first labels to second labels, the second labels being set to a same label for feature points of the object with at least one of a congruence relation in appearance or a mirror symmetry relation to one another; and a second inference means configured to infer, by using an inference engine, the positions of the feature points based on the second labels and feature point images in which the feature points are respectively imaged, the feature point images being generated from the object image based on a result of the first inference, the inference engine being learned by the learning device according to any one or Supplementary Notes 1 to 7.

[Supplementary Note 9]

A control method executed by a computer, the control method comprising:

acquiring a combination of a first label that is a unique label for each feature point of an object and a feature point image in which a feature point corresponding to the first label is imaged;

converting the first label to a second label that is set to a same label for feature points of the object with at least one of a congruence relation in appearance or a mirror symmetry relation to one another; and learning an inference engine based on the second label, the feature point image, and correct answer data regarding a position of the feature point, the inference engine being configured to perform an inference on the position of the feature point included in an image that is inputted to the inference engine.

[Supplementary Note 10]

A storage medium storing a program executed by a computer, the program causing the computer to function as:

an acquiring means configured to acquire a combination of a first label that is a unique label for each feature point of an object and a feature point image in which a feature point corresponding to the first label is imaged;

a conversion means configured to convert the first label to a second label that is set to a same label for feature points of the object with at least one of a congruence relation in appearance or a mirror symmetry relation to one another; and a learning means configured to learn an inference engine based on the second label, the feature point image, and correct answer data regarding a position of the feature point, the inference engine being configured to perform an inference on the position of the feature point included in an image that is inputted to the inference engine.

[Supplementary Note 11]

An inference device comprising:

a first inference means configured to perform, in a case where an object image in which an object is imaged is inputted thereto, a first inference on positions of feature points of the object and first labels corresponding to the feature points;

a conversion means configured to convert the first labels to second labels, the second labels being set to a same label for feature points of the object with at least one of a congruence relation in appearance or a mirror symmetry relation to one another; and a second inference means configured to infer each of the positions of the feature points based on the second labels and feature point images in which the feature points are respectively imaged, the feature point images being generated from the object image based on a result of the first inference.

[Supplementary Note 12]

A control method executed by a computer, the control method comprising:

performing, in a case where an object image in which an object is imaged is inputted thereto, a first inference on positions of feature points of the object and first labels corresponding to the feature points;

converting the first labels to second labels, the second labels being set to a same label for feature points of the object with at least one of a congruence relation in appearance or a mirror symmetry relation to one another; and inferring each of the positions of the feature points based on the second labels and feature point images in which the feature points are respectively imaged, the feature point images being generated from the object image based on a result of the first inference.

[Supplementary Note 13]

A storage medium storing a program executed by a computer, the program causing the computer to function as:

a first inference means configured to perform, in a case where an object image in which an object is imaged is inputted thereto, a first inference on positions of feature points of the object and first labels corresponding to the feature points;

a conversion means configured to convert the first labels to second labels, the second labels being set to a same label for feature points of the object with at least one of a congruence relation in appearance or a mirror symmetry relation to one another; and a second inference means configured to infer each of the positions of the feature points based on the second labels and feature point images in which the feature points are respectively imaged, the feature point images being generated from the object image based on a result of the first inference.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS

1, 1A Learning device
3 Inference device
10, 30 Display unit
11 Communication unit
12, 32 Input unit
13, 33 Control unit
14, 34 Storage unit
31 Interface

What is claimed is:

1. A learning device comprising:
at least one memory configured to store instructions; and
at least one processor configured to execute the instructions to:
acquire a first combination of
a first label that is a unique label for each feature point of an object, and
a feature point image in which a feature point corresponding to the first label is imaged;
convert the first label to a second label that is set to a same label for feature points of the object with at least one of a congruence relation in appearance or a mirror symmetry relation to one another; and
learn an inference engine based on the second label, the feature point image, and correct answer data regarding a position of each feature point, wherein the inference engine is configured to perform an inference on the position of each feature point included in an image that is inputted to the inference engine, and wherein the at least one processor is configured to execute the instructions to further:

convert the first label to the second label based on label information indicating a correspondence between the first label and the second label;

make a determination on a second combination of the feature points of the object with at least one of the congruence relation in appearance or the mirror symmetry relation; and generate label information based on a result of the determination.

2. The learning device according to claim 1, wherein the at least one processor is configured to execute the instructions to acquire the first combination by inputting an object image in which the object is imaged to a first inference engine, and the first inference engine is configured to perform, based on the object image inputted to the first inference engine, an inference on the position of each feature point of the object and the first label corresponding to the feature point.

3. A learning device comprising:
at least one memory configured to store instructions; and
at least one processor configured to execute the instructions to:
acquire a combination of
a first label that is a unique label for each feature point of an object, and
a feature point image in which a feature point corresponding to the first label is imaged;
convert the first label to a second label that is set to a same label for feature points of the object with at least one of a congruence relation in appearance or a mirror symmetry relation to one another; and
learn an inference engine based on the second label, the feature point image, and correct answer data regarding a position of each feature point, wherein the inference engine is configured to perform an inference on the position of each feature point included in an image that is inputted to the inference engine, and wherein the at least one processor is configured to execute the instructions to further:

convert, in a case where there are a first feature point and a second feature point of the object with the mirror symmetry relation, the feature point image corresponding to the second feature point by mirror operation; and learn the inference engine configured to perform an inference on a second label to which the first feature points and the second feature points correspond based on the feature point image corresponding to the first feature point and the converted feature point image.

4. The learning device according to claim 1, wherein the at least one processor is configured to execute the instructions to further learn the inference engine for each second label based on the feature point image and the correct answer data for the each second label.

5. A learning device comprising:
at least one memory configured to store instructions; and
at least one processor configured to execute the instructions to:
- acquire a combination of
  - a first label that is a unique label for each feature point of an object, and
  - a feature point image in which a feature point corresponding to the first label is imaged;
- convert the first label to a second label that is set to a same label for feature points of the object with at least one of a congruence relation in appearance or a mirror symmetry relation to one another; and
- learn an inference engine based on the second label, the feature point image, and correct answer data regarding a position of each feature point, wherein the inference engine is configured to perform an inference on the position of each feature point included in an image that is inputted to the inference engine, and
wherein the at least one processor is configured to execute the instructions to further:
- generate one or more feature point images obtained by at least one of shifting a center position of the feature point image or enlarging or scaling down the feature point image; and
- add the feature point images to data to be used for leaning the inference engine.

* * * * *